(12) United States Patent
Mayer

(10) Patent No.: US 6,874,121 B1
(45) Date of Patent: Mar. 29, 2005

(54) DOCUMENT EDITOR FOR EDITING STRUCTURE DOCUMENTS

(75) Inventor: James Lyman Mayer, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/448,912

(22) Filed: Nov. 24, 1999

(51) Int. Cl.[7] .............................................. G06F 17/21
(52) U.S. Cl. ........................ 715/513; 715/530; 707/100
(58) Field of Search ................................ 715/513, 530, 715/531; 707/100

(56) References Cited

U.S. PATENT DOCUMENTS 5,285,526 A * 2/1994 Bennett et al. ............. 715/516
5,557,720 A * 9/1996 Brown et al. ............... 715/513
5,907,851 A * 5/1999 Yamakawa et al. ......... 715/540
6,167,409 A * 12/2000 DeRose et al. ............. 715/513

OTHER PUBLICATIONS

"Digest 2.11" http://pintday.org/digests/9811.shtml.*
Netscape Communicator 4.08 © 1994–1998, Screenshots and documents.*

* cited by examiner

Primary Examiner—Stephen S. Hong
Assistant Examiner—Adam Queler
(74) Attorney, Agent, or Firm—Fay, Sharpe, Fagan, Minnich & McKee, LLP

(57) ABSTRACT

A document editor is designed for editing structured documents. The document editor allows a user to select a linear range within the document and apply editing operations to the range. In this regard, the document editor differs from conventional document editors for structured documents. A user is not constrained to act solely on the underlying syntactic entities of the structured document.

4 Claims, 13 Drawing Sheets

US 6,874,121 B1

DOCUMENT EDITOR FOR EDITING STRUCTURE DOCUMENTS

TECHNICAL FIELD

The present invention relates generally to computer systems and more particularly to a document editor for editing structured documents as if the structured documents were encoded as linear representations.

BACKGROUND OF THE INVENTION

Documents may generally be categorized as being either structured or unstructured. Unstructured documents represent the contents of the documents as a linear sequence of characters. These characters include the content of the document as well as control characters that specify formatting information regarding the document. A structured document, in contrast, is not ordered as a linear representation but typically is organized as a tree structure or other type of directed acyclic graph. For example, a document may be represented as a tree with a document node at the top having child nodes representing the front and back portions of the document. The front and back portions of the document may include sections, paragraphs and the like. These components are all organized as a hierarchical tree. Each structured document may be specified in a structured document language, such as the extensible markup language (XML) or the Standard Generalized Mark-up Language (SGML), or may be specified in accordance a known standard, such as the Office Document Architecture (ODA) standard.

For users, the editing of unstructured documents is fairly intuitive and straightforward. The user simply selects a portion of the document to be edited and then applies an editing operation to the selected portion. With structured documents, editing is not as straightforward. Structured document editors require that the user operate on the syntactic entities (e.g. section, paragraph, etc.) specified within the structured document. As a result, editing operations may be cumbersome. Often times, it is not possible in a single operation to edit a portion of the document that spans the boundaries of syntactic entities.

SUMMARY OF THE INVENTION

The above-described limitations of conventional document editors are resolved by the present invention. The present invention provides a document editor for editing structured documents that is flexible and easy to use. The document editor allows a user to edit a structured document as if the document is an unstructured document. The user may specify ranges within the document that are to be edited independently of whether the ranges correspond to syntactic entities defined within the structured document. For example, a user may define a range that begins in the middle of a first paragraph and ends in the middle of a second paragraph and asks the editor to delete the range.

In accordance with one aspect of the present invention, a method is practiced in a computer system that includes a document editor for editing a structured document. The structured document includes syntactic entities that define logically bounded portions of the document, and these entities are organized into a structure. A portion of the document that does not correspond to one of the syntactic entities is edited. The document may be organized as a tree structure and may be an SGML document, an ODA document or another variety of document. The editing operation may include the insertion of a sub-tree of syntactic entities into the document, the deletion of a range within the document or other editing operations.

In accordance with another aspect of the present invention, a linear range is identified within a structured document. The structured document is logically organized as a tree-like structure. An editing operation is performed on the range by a document editor running on a computer system.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a document editor for editing structured documents. The document editor provides the desirable characteristics of document editors for unstructured documents in that a linear range in a structured document may be selected and edited. There is no need to convert the structured document into a linear representation before applying the editing operation. Instead, in the illustrative embodiment, the operations are performed directly on the tree that represents the structured document. As a result, the document editor is easier to use and more flexible in its scope of operations.

Figure 1:
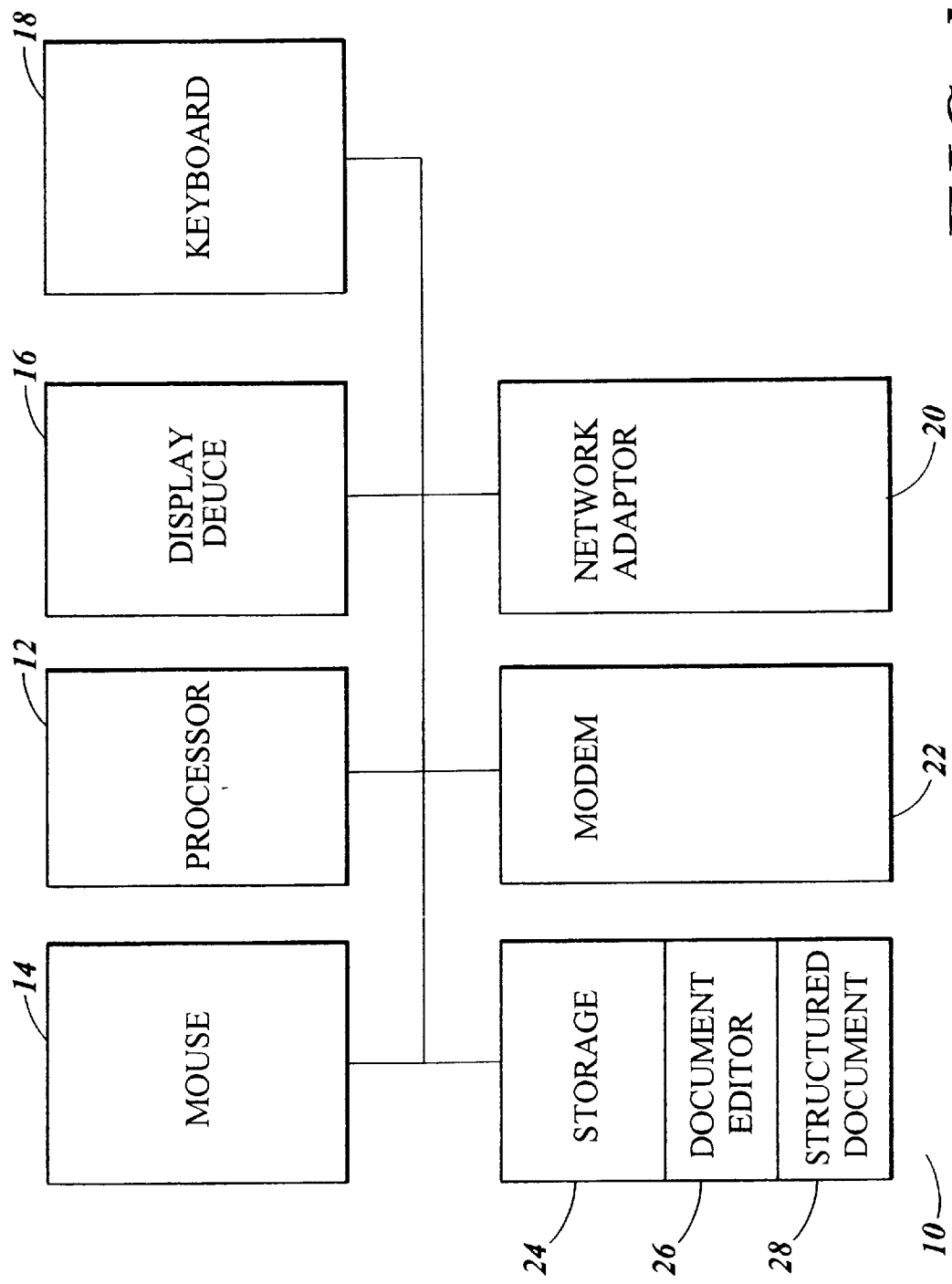
FIG. 1 is a block diagram of a computer system that is suitable for practicing the illustrative embodiment.

FIG. 1 is a block diagram of a computer system 10 that is suitable for practicing the illustrative embodiment of the present invention. Those skilled in the art will appreciate that the present invention may also be practiced with other types of electronic devices other than computer systems. In general, these electronic devices may include pagers, set-top boxes, or other electronic devices that are capable of editing documents. For purposes of the discussion below, it is presumed that a computer system is employed in practicing the illustrative embodiment.

The computer system 10 of FIG. 1 includes a processor 12, such as a conventional microprocessor, for executing instructions and overseeing operation of the computer system. The computer system 10 also includes a mouse 14, a display device 16 and a keyboard 18. A graphical user interface (GUI) may be displayed on the display device 16 to assist a user interacting with the computer system 10. The computer system 10 may also include a network adapter 20 for interfacing the computer system with the local area network (LAN). A modem 22 may be provided to enable the computer system 10 to communicate with remote computing resources. The modem 22 may be a conventional data/fax modem, a wireless modem or even a cable modem.

The computer system 10 includes storage 24 may include both primary storage and secondary storage. The storage 24 may be implemented by one or more varieties of storage devices. These devices may include computer-readable media and removable media, such as optical disks or magnetic disks. The storage 24 holds a copy of a document editor 26 for editing documents. The storage 24 holds at least one structured document 28. For purposes of the discussion below, it is presumed that the structured document is encoded in SGML or another language for specifying structured documents. For example, the document may also be encoded in accordance with the ODA standard.

Those skilled in the art will appreciate that the configuration of the computer system shown in FIG. 1 is intended to be merely illustrative and not limiting of the present invention. The present invention may be practiced with computer systems that include different peripheral devices and interconnections.

Figure 2:
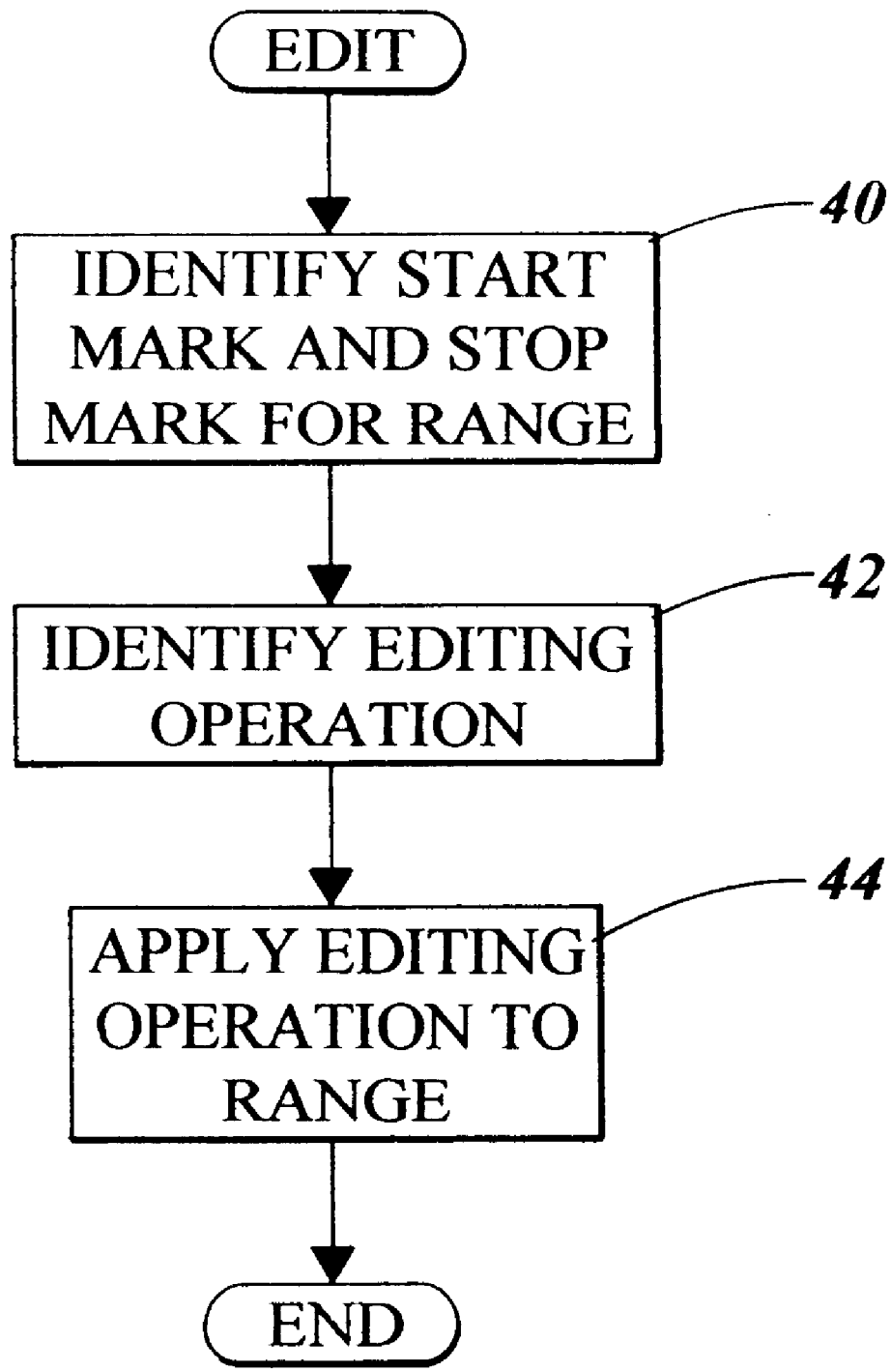
FIG. 2 is a flow chart illustrating the steps that are performed for an edit operation in the illustrative embodiment.

FIG. 2 is a flow chart illustrating the steps that are performed by the document editor 26 in performing an editing operation. Initially, the document editor identifies a start mark and a stop mark for a range to be edited (step 40 in FIG. 2). The start mark and stop mark represent the beginning and end of a range that is to be edited within the structured document 28. This range may constitute, for example a group of characters that span the boundaries of syntactic entities, such as sections, paragraphs and words within the structured document. A mark describes a position under a node in a structured document.

Figure 3:
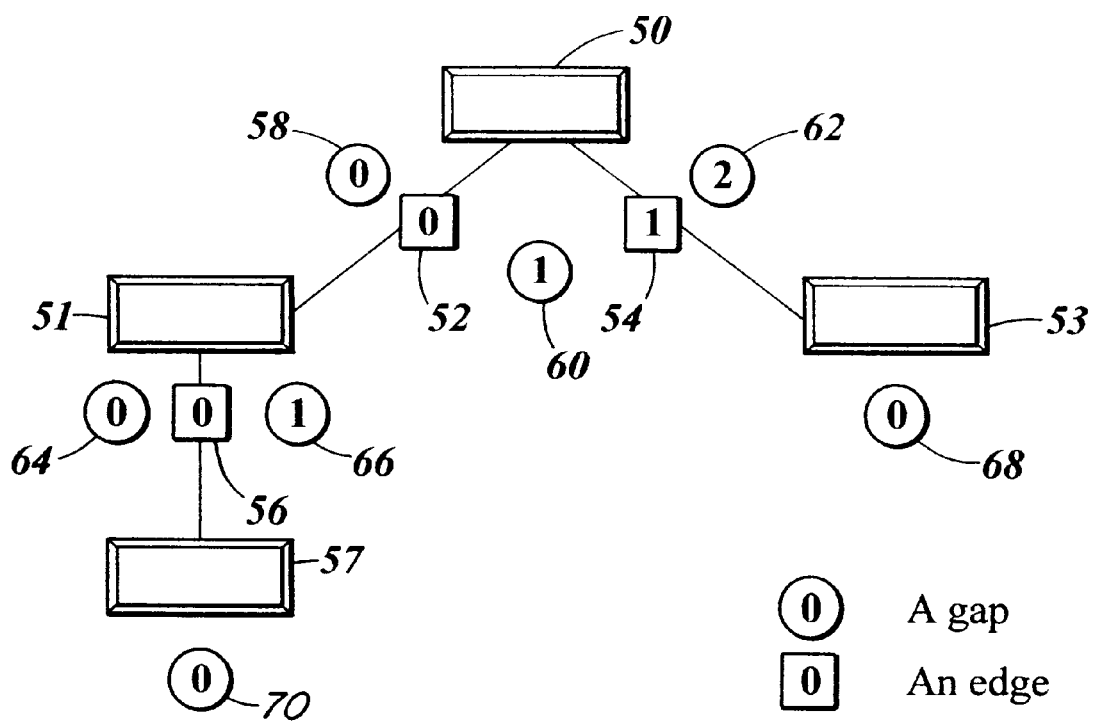
FIG. 3 depicts a portion of a structured document that illustrates the notion of gaps and edges.

FIG. 3 shows an example of a simple structured document that is organized as a tree structure. The components of the tree are stored in data structures in a file. The document includes a root node 50 that is connected by edges 52 and 54 to nodes 51 and 53, respectively. Node 51 is connected by edge 56 to its child node 57. As can be seen in FIG. 3, the edges under each node are numbered in sequence from left to right beginning with the number 0. Hence, edge 52 is assigned the number 0 and edge 54 is assigned the number 1. Edge 56 under node 51 is assigned the edge number 0.

Each node has a gap below it. A node with n outgoing edges has n+1 gaps below it. The gaps are numbered beginning with 0. Node 50 has gaps 58, 60 and 62 below it. Node 51 has gaps 64 and 66 below it. Node 53 has gap 68 below it, and node 57 has gap 70 below it.

Figure 4:
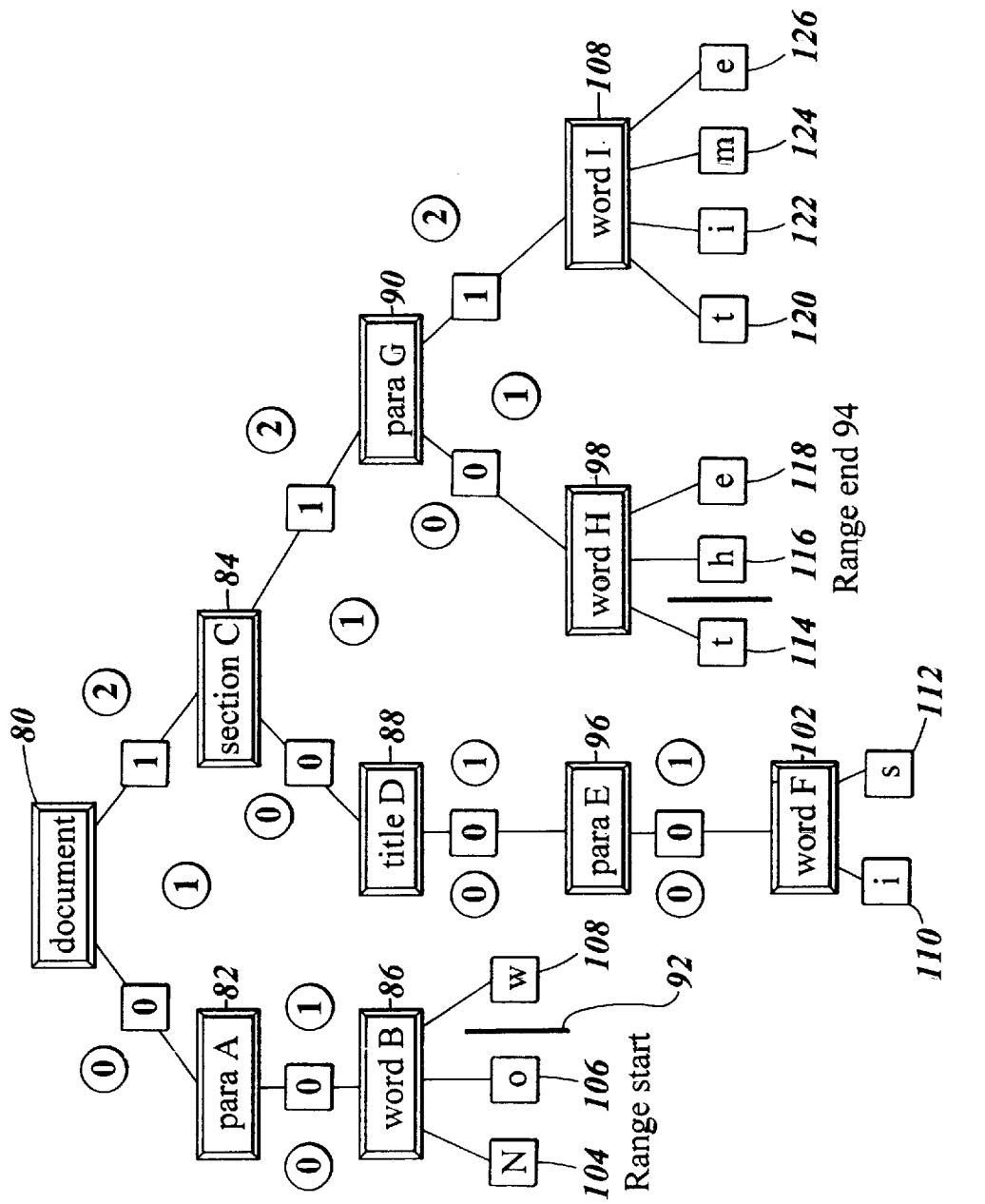
FIG. 4 illustrates a portion of an exemplary structured document.

A mark is defined by a path originating from the root node to another node in the tree, which is referred to as the "base" of the mark. The mark is also defined by the index of a gap under the node, which is referred to as the "index" of the mark. FIG. 4 shows an example of a start mark 92 and a stop mark 94 that define the beginning and end of a range to which an editing operation is to be applied.

The editing operation that is to be performed is identified (step 42 in FIG. 2). The editing operation may delete the contents of the range (i.e. deletion), replace the contents of the range with new content or add content within the range (i.e. insertion). The insertion and deletion operations will be described in more detail below. The editing operation may be defined by the user by selecting menu options provided by the user interface of the document editor, activating buttons on the user interface or generally providing user input. Alternatively, the editing operation may be specified programmatically by a macro or other resource.

The editing operation completes by applying the editing operation to the range (step 44 in FIG. 2). The resulting edited structured document may be saved or subject to additional editing.

In order to better appreciate the editing operations that may be performed by the document editor 26 of the illustrative embodiment, it is helpful to consider an example document. FIG. 4 depicts an example structured document. In SGML, the document appears as follows:

```
            <document>
                <para A>
                    No_sw
                <\para>
                <section C>
                    <title D>
                        <para E>
                            is
                        <\para>
                    <\title>
                    <para G>
                        t_ehe time
                    <\para>
                <\section>
            <\document>
```

In FIG. 4, the structured document is organized as a tree with the document node 80 at its root. The document node 80 has two children nodes: a paragraph node 82 and a section node 84. The paragraph node 82 includes a word node 86 child. The word node has three children nodes, 104, 106 and 108 which represent the respective letters of the word "now."

The section node 84 includes a title node 88 child and a paragraph node 90 child. The title node 88 is followed by a paragraph node 96. Word node 102 is a child of the paragraph node 96. Word node 102 includes children nodes 110 and 112 representing the letters of the word "is." Paragraph node 90 has two children nodes: a word node 98 and a word node 100. Word node 98 includes children nodes 114, 116 and 118 that represent the respective letters of the word "the." Similarly, word node 100 has children nodes 120, 122, 124 and 126, which represent the respective letters of the word "time." The gaps and edges are numbered as described above.

Figure 5:
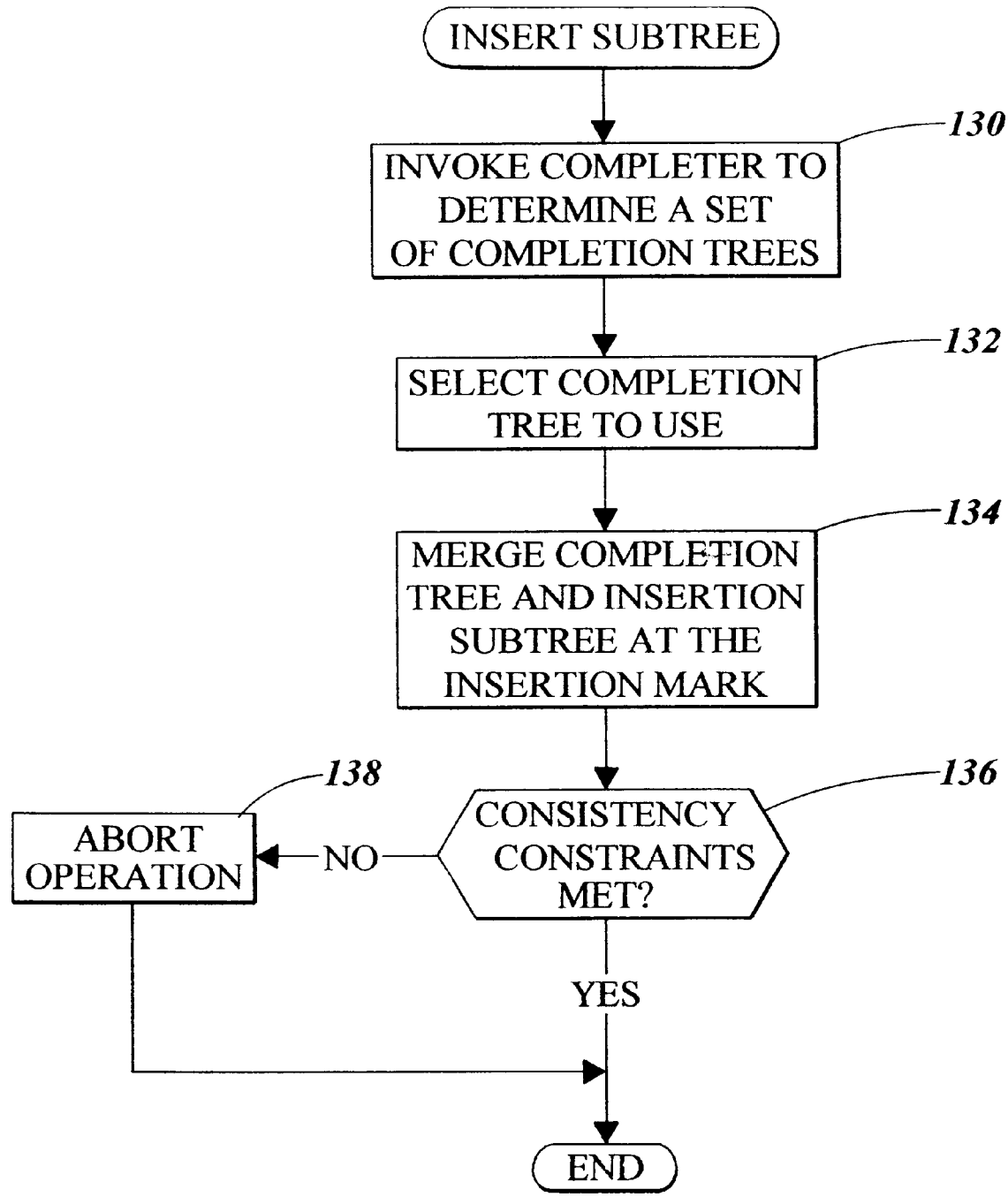
FIG. 5 is a flow chart illustrating steps that are performed in an insert sub-tree operation.

One of the editing operations that a user may wish to perform is to insert new content into the structured document. The new content constitutes a sub-tree that is to be added to the existing tree of the document. FIG. 5 is a flow chart illustrating the steps that are performed for such an insert sub-tree operation. A mark in a document identifies where the sub-tree is to be inserted. The document editor 26 provides a completer, which is procedure that accepts a mark and an insertion sub-tree as input parameters and produces a set of completion sub-trees. The insertion sub-tree is the sub-tree of content that is to be inserted into the structured document. The completion sub-trees represent the appearance of the structured document after the insertion sub-tree is added to a structured document. The respective completion sub-trees represent different possibilities of how the content may be inserted into the structured document. Hence, as an initial step, a completer is invoked to determine a set of completion trees for a structured document, given a mark and an insertion sub-tree (step 130 in FIG. 5).

Suppose that the document is of a given document type and that a grammar describes the document type as follows:

```
<document>
    ←<front><back>
<front>
    ←<section>
<back>
    ←<section>
<section>
    ←<title>(<paragraph> | <section>)+
<title>
    ←<paragraph>
<paragraph>
    ←<word>+
<word>
    ←<character>+
```

This grammar specifies that a document includes a front and a back and that the front may include a section and the back may include a section. A section may include a title and one or more paragraphs or sections. A title may include a paragraph, and a paragraph may include one or more words. Each word may include one or more characters.

Figure 6A:
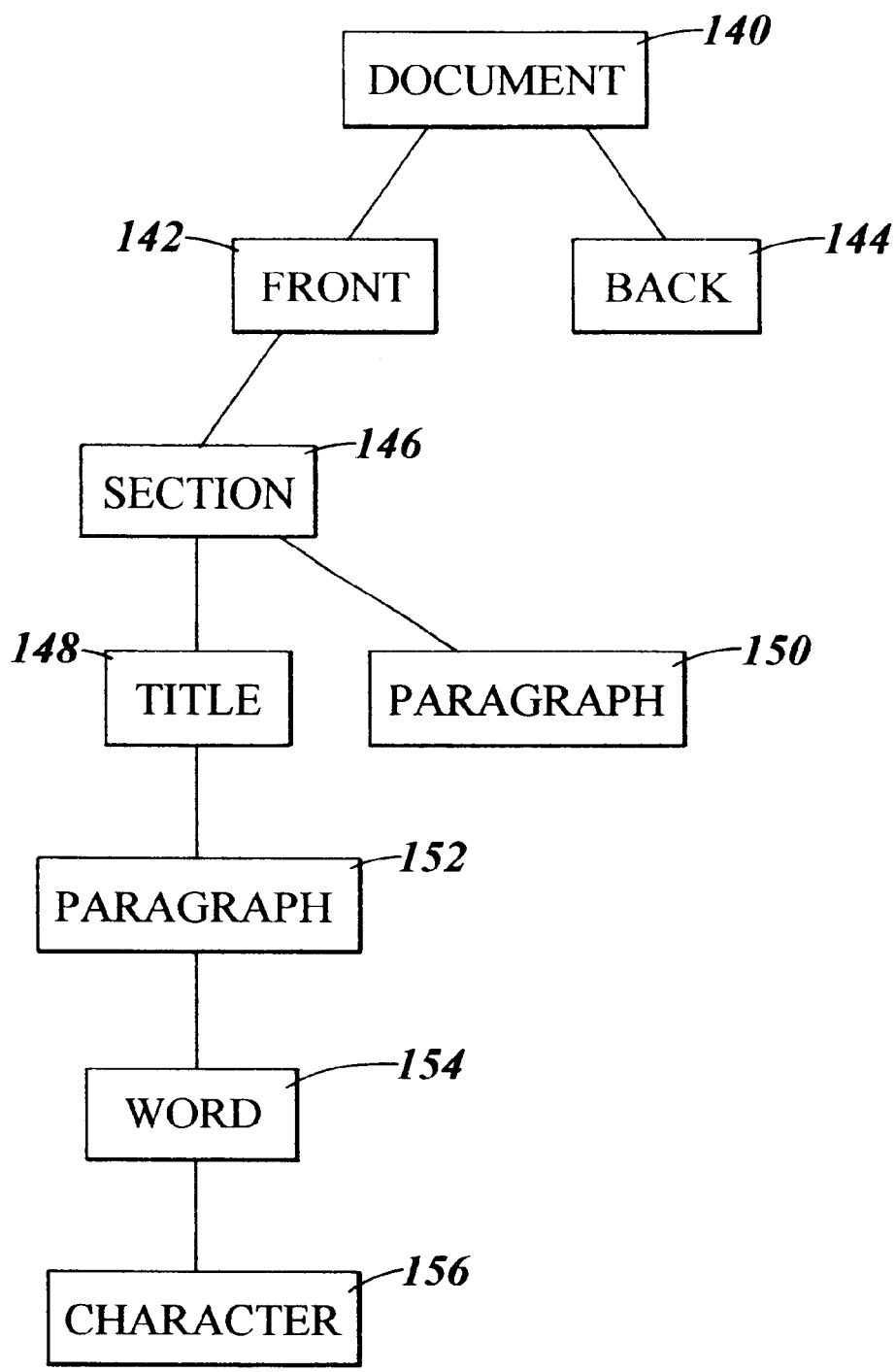
FIGS. 6A–6D illustrate examples of different completion trees.
Figure 6B:
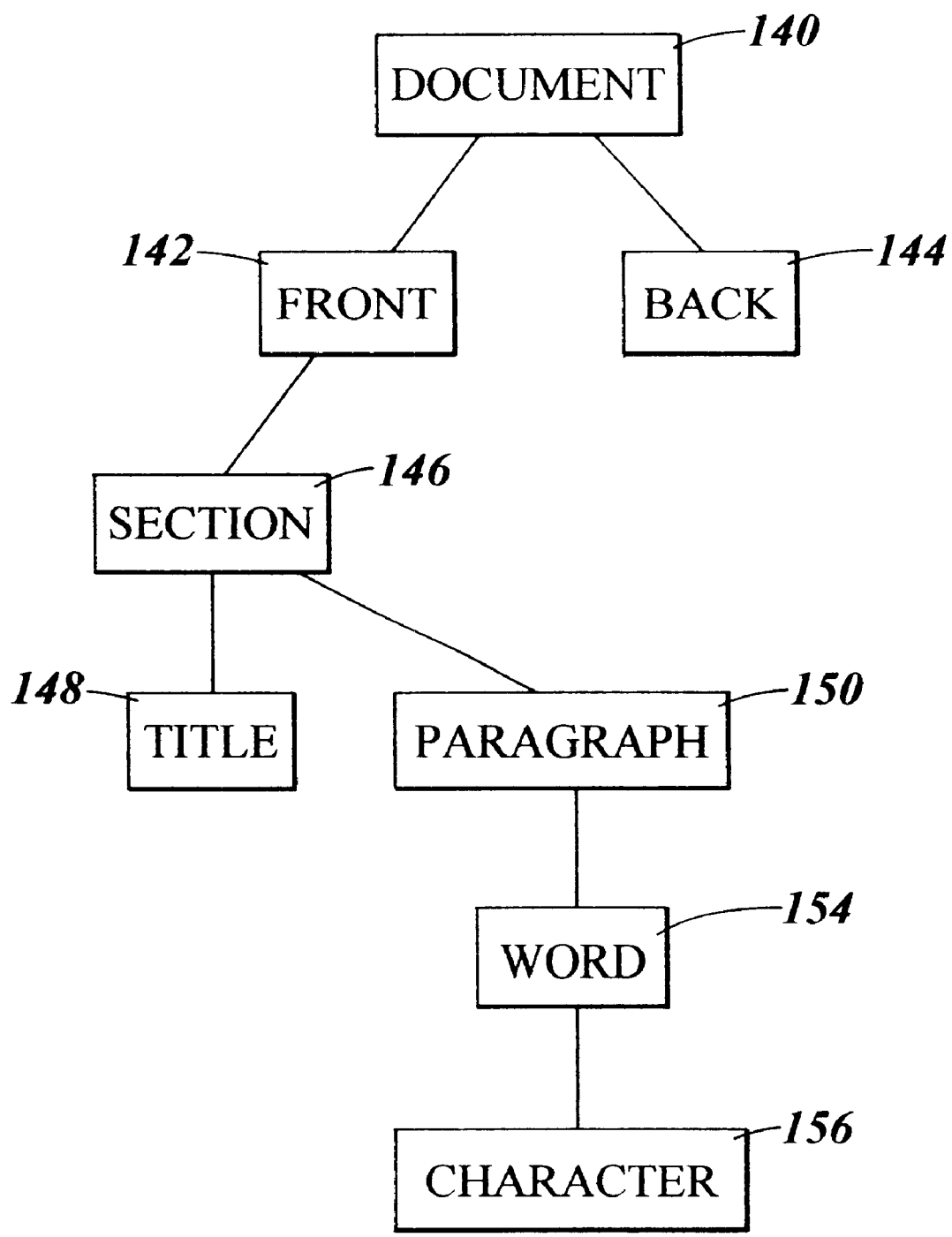
Figure 6C:
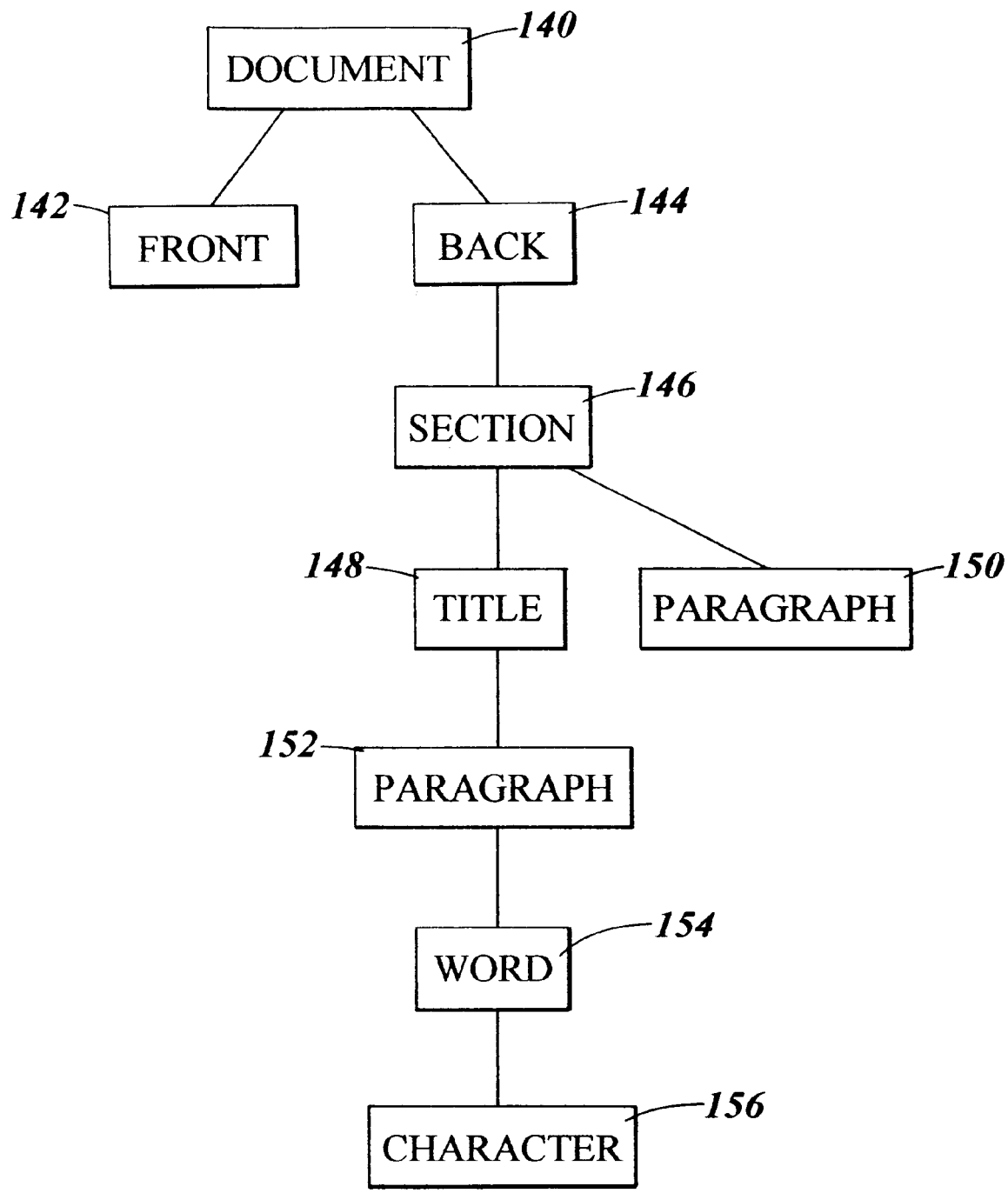
Figure 6D:
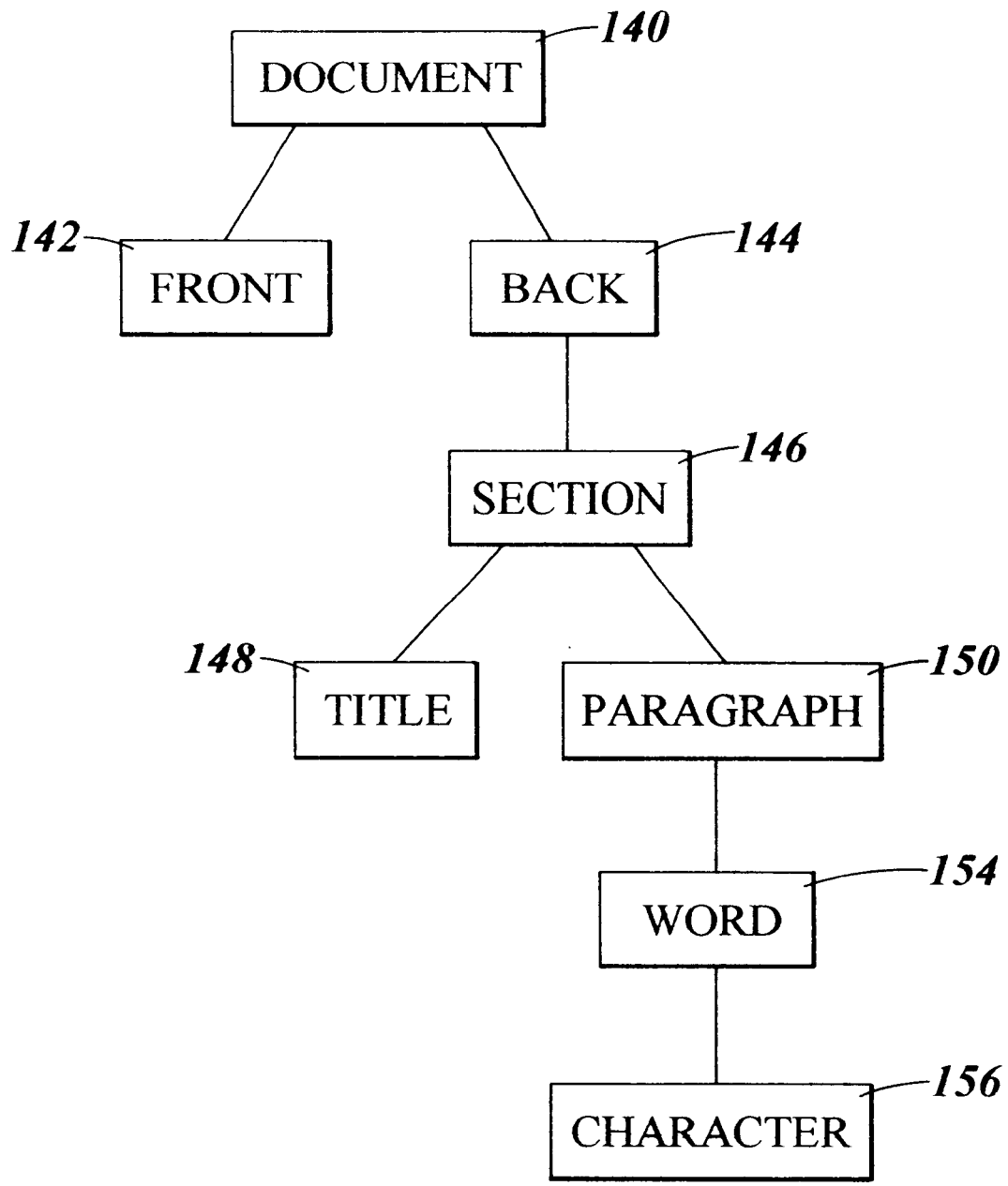

Further suppose that for a document type that is described by this grammar, a user wishes to insert an insertion sub-tree for the letter X into a structured document that includes a single document node with no children. The resulting possible completion trees are depicted in FIG. 6A, 6B, 6C and 6D. As can be seen in FIG. 6A, due to the restrictions of the grammar, the document has to include document node 140 and front and back nodes 142 and 144, respectively. The front node 142 for the completion tree depicted in FIG. 6A includes child node 146 for a section. The section node 146 includes a title node child 148 and a paragraph node child 150. The title node child 148 includes a paragraph node 152 that contains a word node 154. The word node 154 includes a character node 156 associated with the letter X. For the alternative completion tree depicted in FIG. 6B the character X is part of the paragraph associated with paragraph node 150. Thus, the resulting tree structure has the form depicted in FIG. 6B. In FIG. 6C, the character associated with character node 156 is positioned within the back section of the document and thus is under the back node 144. In FIG. 6D, the character is also under the back node 144 but is part of the paragraph associated with paragraph node 150.

The completer generates each of these completion trees. One of the completion trees must be selected for use (step 132 in FIG. 5). A number of different options may be employed to select the completion tree that is to be used. For example, the completion trees may be presented to the user for selection by the user. Alternatively, the document editor 26 may apply heuristics to determine the most desirable completion tree. The completion tree and the insertion sub-tree are merged at the insertion mark (step 134 in FIG. 5). A check is then made whether the consistency constraints as defined by the grammar are met or not (step 136 in FIG. 5). If the consistency constraints are met, the insertion mark is removed. However, if the consistency constraints are not met, the operation must be aborted because the insertion would result in a document that does not comply with the grammar associated with the defined document type.

Another principal operation that may be performed by the document editor 26 is the delete operation that deletes a given range. The delete operation takes as its input parameter a range delineated by a pair of marks and a procedure that chooses among multiple possible completions. The delete range operation produces a revised structured document where the range has been deleted.

Figure 7:
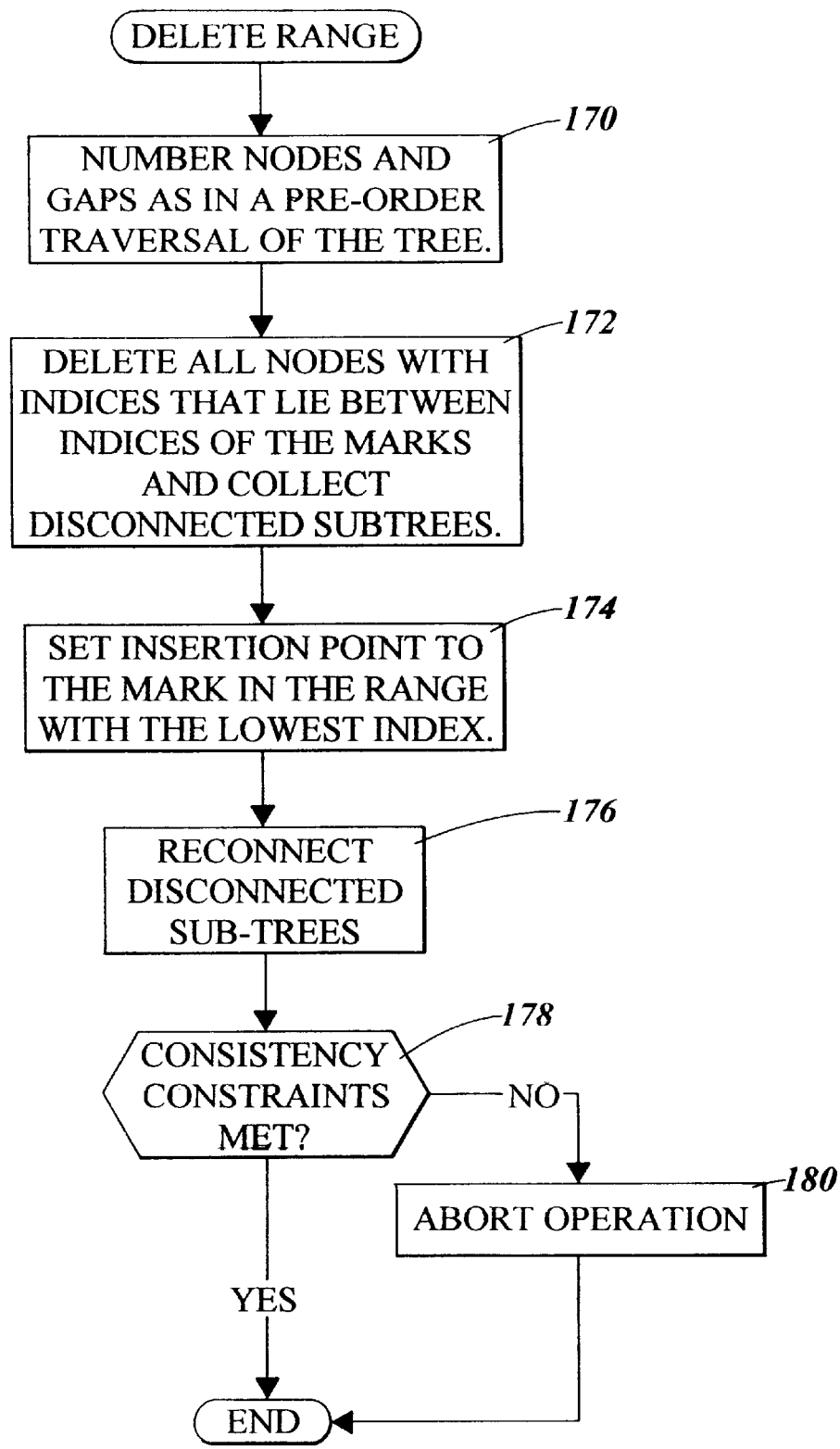
FIG. 7 is a flow chart illustrating the steps performed in a delete range operation.
Figure 8:
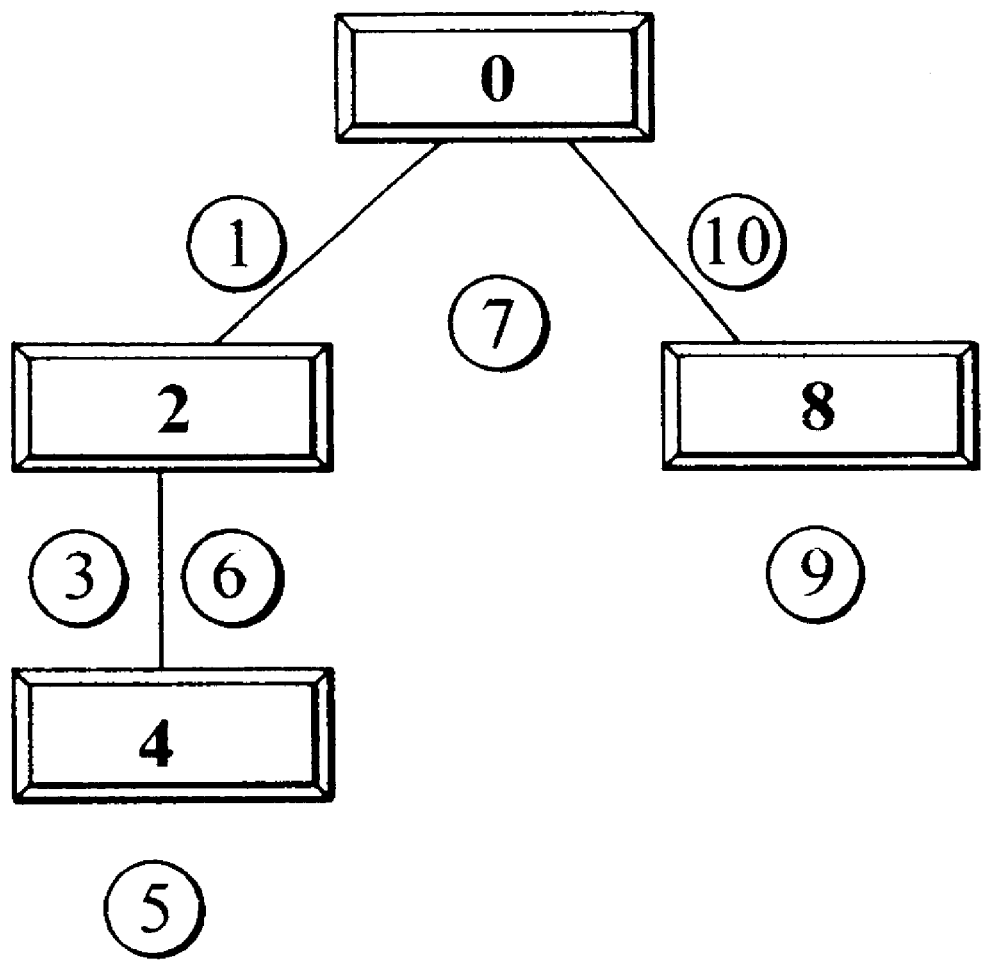
FIG. 8 illustrates a portion of a document in which nodes and gaps have been numbered according to a pre-order traversal of the tree.

FIG. 7 is a flow chart illustrating the steps that are performed by the delete range operation. Initially, the nodes and gaps of the structured document are numbered in a pre-order traversal of the tree. FIG. 8 illustrates the sequence that is performed to number the nodes and gaps in the pre-order traversal. The numbering begins at the root node and then extends to the lowest magnitude gap beneath the root node to the leftmost child node and then continues in the sequence specified by the numbers ranging from 3 to 10 in FIG. 8. All the nodes that have indices that lie between the indices of the marks that define the range to be deleted are deleted and the disconnected sub-trees are collected (step 172 in FIG. 7). For the example document depicted in FIG. 4 where mark 92 and mark 94 define the range to be deleted, all of the nodes having indices between the marks are removed. Specifically nodes 84, 88, 96, 102, 110, 112, 90, 98 and 114 are all deleted. The deletion of the nodes may result in several disconnected sub-trees that require reinsertion. Hence, the insertion point is set to the mark and the range with the lowest index (step 174 in FIG. 7). For the example case depicted in FIG. 5, the insertion point is set to the mark 92. Steps are then taken to reinsert the disconnected sub-trees (step 176 in FIG. 7). The steps that are taken will be described in more detail below. A final check is made whether the consistency constraints are fulfilled or not (step 178 in FIG. 7). If the consistency constraints are not met, the delete range operation is aborted (step 180 in FIG. 7).

Figure 9:
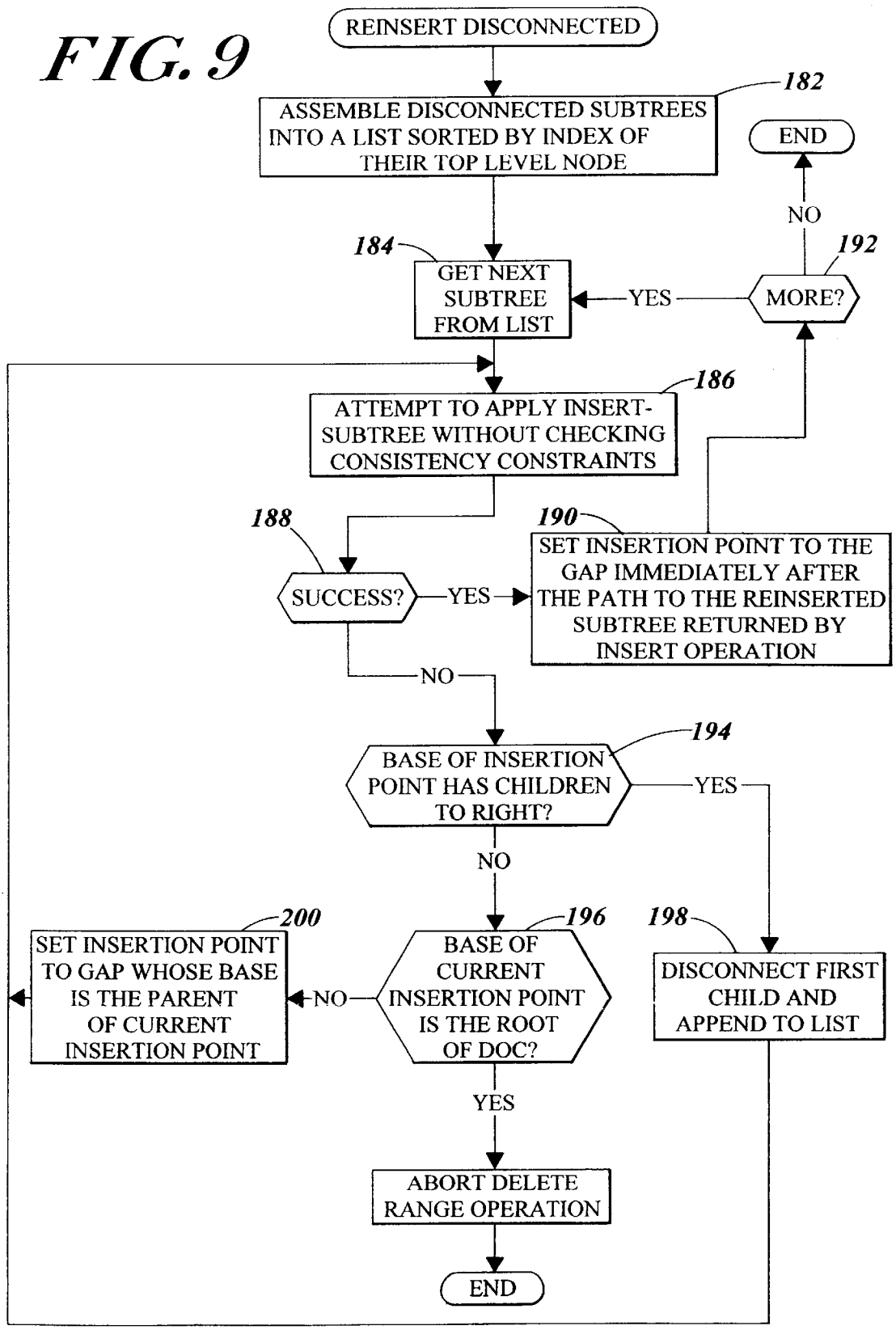
FIG. 9 is a flow chart illustrating the steps that are performed in an operation to reinsert a dismantled sub-tree after a delete range operation.

FIG. 9 is a flow chart is a flow chart illustrating the steps that are performed to reinsert the disconnected sub-trees. The disconnected sub-trees are initially gathered into a list (step 182 in FIG. 9). The list is ordered according to the index of the top level node of the sub-tree. The sub-trees are then processed sequentially be getting the next sub-tree from the list ranging from lower indices to greater indices (step 184 in FIG. 9). The steps that follow are applied until the processing is done (see step 192 in FIG. 9) such that the last sub-tree on the list has been processed to be reinserted.

For each sub-tree in the list, an attempt is made to apply an insert sub-tree operation without checking for consistency constraints (step 186 in FIG. 9). If such a insert sub-tree operation is successful (see step 188 in FIG. 9), the insertion point is updated to be set to the gap immediately after the path to the reinserted sub-tree (step 190 in FIG. 9). This updates the insertion point to be able to handle the next sub-tree that is to be reinserted. The process then checks whether it is done (step 192 in FIG. 9) and repeats beginning with step 184 of FIG. 9 if not done.

If the attempt to apply the insert sub-tree operation is not successful (see step 188 in FIG. 9), a check is made whether the base of the insertion point mark has any children to the right of it (step 194 in FIG. 9). If there are not children to the right of the base of the insertion point, the first child is disconnected and the sub-tree is appended to the end of the list of disconnected sub-trees (step 198 in FIG. 9).

If the attempt to perform the insert sub-tree operation is unsuccessful and the base of the insertion point has children to the right of it, a check is made whether the base of the current insertion point is the root of the document (step 196 in FIG. 9). If the base of the current insertion point is the root of the document, the delete range operation is aborted (step 202 in FIG. 9). Otherwise, the insertion point is set to the gap whose base is the parent of the current insertion point (step 200 in FIG. 9). The attempt to apply insertion sub-tree may then be repeated beginning with step 186 of FIG. 9.

Figure 10:
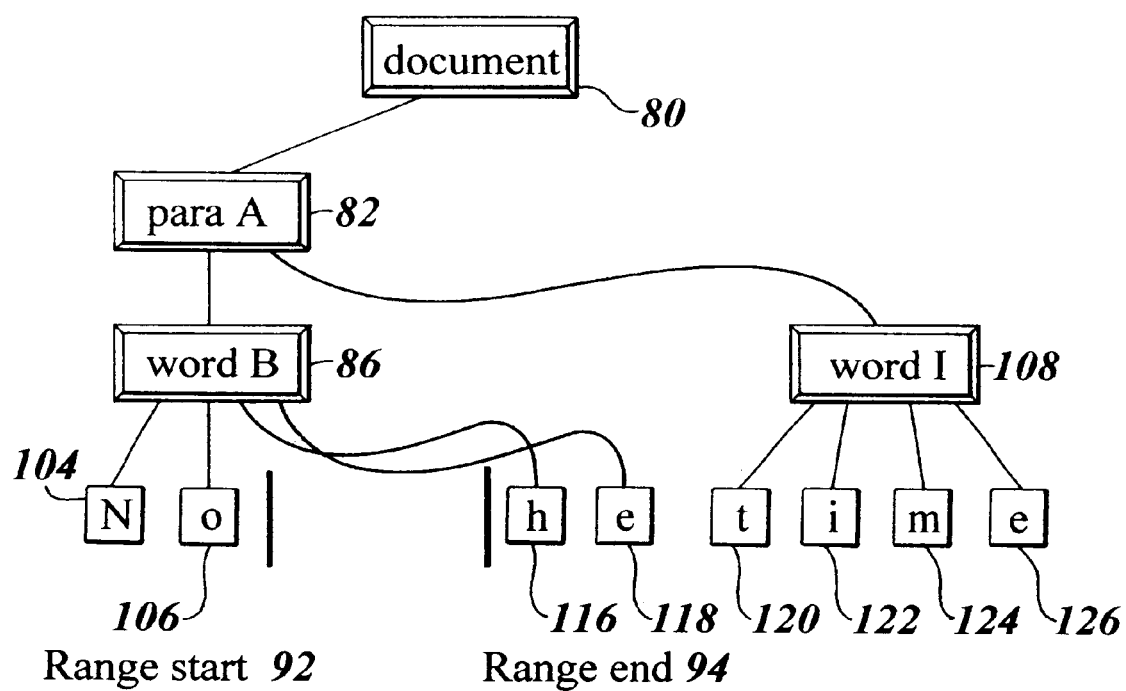
FIG. 10 illustrates the document of FIG. 4 after a delete range operation has been performed.

FIG. 10 depicts the appearance of the structured document of FIG. 4 after the delete range operation has been performed for the range delineated by mark 92 and 94. The nodes identified above have been deleted and the tree structure has been modified so that the word node 108 is a child of paragraph node 82. In addition, the tree has been modified so that word node 86 now has children nodes 116 and 118. These modifications are performed by the reinsertion of sub-trees as described above.

While the present invention has been described with reference to an illustrative embodiment thereof, those skilled in the art will appreciate that various changes in form and detail may be made without departing from the intended scope of the present invention as defined in the appended claims.

What is claimed is:

1. In a computer system a method of editing a structured document organized as a tree-like structure, the method of editing comprising:
   (a) numbering nodes and gaps of the structured document;
   (b) identifying a linear range within the structured document to be deleted, wherein marks define the linear range of the structured document to be deleted;
   (c) deleting all nodes that have indices that lie between indices of the marks that define the range of the portion of the document to be deleted;
   (d) gathering subtrees of the structured document which are disconnected by the deleting step, into a list ordered according to an index of a top level node of each of the subtrees;
   (e) processing the list of subtrees sequentially by getting a next subtree from the list ranging from lower indices to greater indices;
   (f) applying an insert subtree operation, wherein the inserting occurs without checking consistency constraints;
   (g) when the insert subtree operation is successful, setting an insertion point to the gap immediately after a path of the reinserted subtree, returned by the insert subtree operation;
   (h) obtaining a next subtree from the list; and
   (i) repeating steps e–h until all subtrees in the list have been processed.

2. The method of claim 1 wherein the method additionally comprises:
   (j) when the insert subtree operation is not successful, checking to determine whether the base of the insertion point mark has any children nodes;
   (k) when there are children nodes, disconnecting a first child and appending the subtree to the end of the list of disconnected subtrees then return to step f;
   (l) when there are no children nodes, determining whether the base of the current insertion point is the root of the structured document;
   (m) when the base of the current insertion point is not the root of the structured document, setting the insertion point to the gap whose base is the parent of the current insertion point then return to step f; and
   (n) when the base of the current insertion point is the root of the document, aborting the delete range operation.

3. The method of claim 1 wherein the document is a Standard Generalized Merkup Language (SGML) document.

4. The method of claim 1 wherein the document is an Office Document Architecture (ODA) document.

* * * * *